United States Patent
Zhang et al.

(10) Patent No.: US 9,578,224 B2
(45) Date of Patent: Feb. 21, 2017

(54) SYSTEM AND METHOD FOR ENHANCED MONOIMAGING

(75) Inventors: Guanghua Gary Zhang, Sunnyvale, CA (US); Michael Lin, Fremont, CA (US); Patrick Shehane, Fremont, CA (US); Hugh Phu Nguyen, Milpitas, CA (US)

(73) Assignee: Nvidia Corporation, Santa Clara, CA (US)

( * ) Notice: Subject to any disclaimer, the term of this patent is extended or adjusted under 35 U.S.C. 154(b) by 405 days.

(21) Appl. No.: 13/609,010

(22) Filed: Sep. 10, 2012

(65) Prior Publication Data

US 2014/0071330 A1    Mar. 13, 2014

(51) Int. Cl.
*H04N 5/232* (2006.01)
*H04N 5/225* (2006.01)
*H04N 5/247* (2006.01)

(52) U.S. Cl.
CPC ............ *H04N 5/232* (2013.01); *H04N 5/2258* (2013.01); *H04N 5/23245* (2013.01); *H04N 5/247* (2013.01)

(58) Field of Classification Search
CPC .............. H04N 5/2258; H04N 5/23245; H04N 5/23296
USPC .................................................. 348/345, 349
See application file for complete search history.

(56) References Cited

U.S. PATENT DOCUMENTS

| | | |
|---|---|---|
| 4,864,629 A | 9/1989 | Deering |
| 5,430,464 A | 7/1995 | Lumelsky |
| 5,483,254 A | 1/1996 | Powell |
| 5,500,939 A | 3/1996 | Kurihara |
| 5,577,981 A | 11/1996 | Jarvik |
| 5,841,447 A | 11/1998 | Drews |
| 5,886,701 A | 3/1999 | Chauvin et al. |
| 5,910,797 A | 6/1999 | Beuk |
| 5,913,727 A | 6/1999 | Ahdoot |

(Continued)

FOREIGN PATENT DOCUMENTS

| | | |
|---|---|---|
| CN | 101420618 | 4/2009 |
| CN | 101945287 | 1/2011 |

(Continued)

OTHER PUBLICATIONS

Duca, et al., A Relational Debugging Engine for Graphics Pipeline, International Conference on Computer Graphics and Ineractive Techniques, ACM SIGGRAPH 2005, pp. 453-463, ISSN: 0730-0301.

(Continued)

*Primary Examiner* — Amy Hsu

(57) ABSTRACT

A system and method for enhanced automatic monoimaging. Embodiments of the present invention are operable for configuring a first camera based on a configuration determination by a second camera. The method includes capturing a first image with the first camera and determining an optical configuration based on an optical measurement performed by a second camera. In one embodiment, the second camera comprises a lower resolution sensor than a sensor of the first camera. The method further includes sending the optical configuration from the second camera to the first camera and adjusting a configuration of the first camera based on the optical configuration. The method further includes capturing a second image with the first camera. The first image and the second image may be preview images.

20 Claims, 8 Drawing Sheets

(56) References Cited

U.S. PATENT DOCUMENTS

| | | |
|---|---|---|
| 5,949,428 A | 9/1999 | Toelle et al. |
| 6,016,474 A | 1/2000 | Kim et al. |
| 6,021,210 A | 2/2000 | Camus et al. |
| 6,057,855 A | 5/2000 | Barkans |
| 6,064,354 A | 5/2000 | DeLuca |
| 6,141,740 A | 10/2000 | Mahalingaiah et al. |
| 6,243,054 B1 | 6/2001 | DeLuca |
| 6,278,418 B1 | 8/2001 | Doi |
| 6,281,903 B1 | 8/2001 | Martin et al. |
| 6,308,565 B1 | 10/2001 | French et al. |
| 6,314,493 B1 | 11/2001 | Luick |
| 6,438,664 B1 | 8/2002 | McGrath et al. |
| 6,476,807 B1 | 11/2002 | Duluk, Jr. et al. |
| 6,492,991 B1 | 12/2002 | Morein et al. |
| 6,496,193 B1 | 12/2002 | Surti et al. |
| 6,525,725 B1 | 2/2003 | Deering |
| 6,545,683 B1 | 4/2003 | Williams |
| 6,559,813 B1 | 5/2003 | DeLuca et al. |
| 6,597,384 B1 | 7/2003 | Harrison |
| 6,611,253 B1 | 8/2003 | Cohen |
| 6,661,907 B2 | 12/2003 | Ho et al. |
| 6,690,381 B1 | 2/2004 | Hussain et al. |
| 6,750,870 B2 | 6/2004 | Olarig |
| 6,825,847 B1 | 11/2004 | Molnar et al. |
| 6,839,062 B2 | 1/2005 | Aronson et al. |
| 6,891,543 B2 | 5/2005 | Wyatt |
| 6,951,515 B2 | 10/2005 | Ohshima et al. |
| 7,015,909 B1 | 3/2006 | Morgan III et al. |
| 7,027,619 B2 | 4/2006 | Pavlidis et al. |
| 7,046,864 B1 | 5/2006 | Pine |
| 7,072,477 B1 | 7/2006 | Kincaid |
| 7,130,453 B2 | 10/2006 | Kondo et al. |
| 7,170,515 B1 | 1/2007 | Zhu |
| 7,203,356 B2 | 4/2007 | Gokturk et al. |
| 7,218,291 B2 | 5/2007 | Abdalla et al. |
| 7,308,115 B2 | 12/2007 | Zhang et al. |
| 7,324,594 B2 | 1/2008 | Lamboray et al. |
| 7,370,016 B1 | 5/2008 | Hunter et al. |
| 7,463,270 B2 | 12/2008 | Vale et al. |
| 7,469,060 B2 | 12/2008 | Bazakos et al. |
| 7,486,290 B1 | 2/2009 | Kilgariff et al. |
| 7,616,202 B1 | 11/2009 | Chen et al. |
| 7,692,659 B1 | 4/2010 | Molnar et al. |
| 7,719,563 B2 | 5/2010 | Richards |
| 7,791,594 B2 | 9/2010 | Dunko |
| 7,839,803 B1 | 11/2010 | Snelgrove et al. |
| 7,856,147 B2 | 12/2010 | Srinidhi |
| 7,925,067 B2 | 4/2011 | Bacus et al. |
| 8,019,449 B2 | 9/2011 | Barzegar et al. |
| 8,024,768 B2 | 9/2011 | Berger et al. |
| 3,031,936 A1 | 10/2011 | Dempski et al. |
| 8,279,168 B2 | 10/2012 | Glomski et al. |
| 8,363,969 B1 | 1/2013 | Wang et al. |
| 8,375,301 B2 | 2/2013 | Nuyttens et al. |
| 8,411,966 B2 | 4/2013 | Zhang et al. |
| 8,610,707 B2 | 12/2013 | Chen |
| 2001/0043571 A1 | 11/2001 | Takahashi et al. |
| 2002/0024675 A1 | 2/2002 | Foxlin |
| 2002/0071594 A1* | 6/2002 | Kool ............. G01S 3/7864 382/103 |
| 2002/0109701 A1 | 8/2002 | Deering |
| 2003/0001857 A1 | 1/2003 | Doyle |
| 2003/0032484 A1 | 2/2003 | Ohshima et al. |
| 2003/0122820 A1 | 7/2003 | Doyle |
| 2003/0160798 A1 | 8/2003 | Buehler |
| 2003/0167235 A1 | 9/2003 | McKinley et al. |
| 2003/0184468 A1 | 10/2003 | Chen et al. |
| 2004/0021664 A1 | 2/2004 | Takemoto et al. |
| 2004/0041822 A1 | 3/2004 | Iizuka et al. |
| 2004/0073827 A1 | 4/2004 | Tsirkel et al. |
| 2004/0102247 A1 | 5/2004 | Smoot et al. |
| 2004/0130552 A1 | 7/2004 | Duluk, Jr. et al. |
| 2004/0157647 A1 | 8/2004 | Takahashi |
| 2004/0205281 A1 | 10/2004 | Lin et al. |
| 2005/0009583 A1 | 1/2005 | Cheung et al. |
| 2005/0062738 A1 | 3/2005 | Handley et al. |
| 2005/0093873 A1 | 5/2005 | Paltashev et al. |
| 2005/0140682 A1 | 6/2005 | Sumanaweera et al. |
| 2006/0170703 A1 | 8/2006 | Liao |
| 2006/0284792 A1 | 12/2006 | Foxlin |
| 2007/0018973 A1 | 1/2007 | Shih et al. |
| 2007/0188444 A1 | 8/2007 | Vale et al. |
| 2007/0217690 A1 | 9/2007 | Dempski et al. |
| 2007/0239409 A1 | 10/2007 | Alan |
| 2007/0257906 A1 | 11/2007 | Shimura et al. |
| 2007/0273714 A1 | 11/2007 | Hodge et al. |
| 2008/0049964 A1 | 2/2008 | Porwal et al. |
| 2008/0143895 A1 | 6/2008 | Peterka et al. |
| 2008/0252596 A1 | 10/2008 | Bell et al. |
| 2008/0273755 A1 | 11/2008 | Hildreth |
| 2008/0293464 A1 | 11/2008 | Cheng et al. |
| 2008/0293488 A1 | 11/2008 | Cheng et al. |
| 2008/0312010 A1 | 12/2008 | Marty et al. |
| 2009/0052859 A1 | 2/2009 | Greenberger et al. |
| 2009/0077504 A1 | 3/2009 | Bell et al. |
| 2009/0099824 A1 | 4/2009 | Falash et al. |
| 2010/0073363 A1 | 3/2010 | Densham et al. |
| 2010/0074489 A1 | 3/2010 | Bacus et al. |
| 2010/0079508 A1 | 4/2010 | Hodge et al. |
| 2010/0149372 A1* | 6/2010 | Silverstein ............. H04N 5/2258 348/223.1 |
| 2010/0177931 A1 | 7/2010 | Whytock et al. |
| 2010/0182447 A1 | 7/2010 | Namba et al. |
| 2010/0194863 A1 | 8/2010 | Lopes et al. |
| 2010/0296747 A1 | 11/2010 | Srinidhi |
| 2011/0159885 A1* | 6/2011 | Song .................... H04W 4/185 455/456.1 |
| 2011/0165841 A1* | 7/2011 | Baek ..................... H04L 67/10 455/41.2 |
| 2011/0181622 A1 | 7/2011 | Bacus et al. |
| 2011/0205379 A1 | 8/2011 | Konicek |
| 2011/0205389 A1* | 8/2011 | Zhang .................. H04N 9/735 348/223.1 |
| 2011/0249076 A1* | 10/2011 | Zhou ..................... H04N 7/147 348/14.02 |
| 2012/0014456 A1 | 1/2012 | Martinez Bauza et al. |
| 2012/0139906 A1 | 6/2012 | Zhang et al. |
| 2012/0162379 A1 | 6/2012 | Dahi et al. |
| 2012/0163762 A1 | 6/2012 | Toida et al. |
| 2012/0183215 A1 | 7/2012 | Van Hook et al. |
| 2012/0257065 A1* | 10/2012 | Velarde ................ H04N 5/2258 348/175 |
| 2012/0262592 A1 | 10/2012 | Rabii |
| 2012/0320232 A1 | 12/2012 | Trumbo |
| 2013/0009943 A1 | 1/2013 | Li et al. |
| 2013/0027521 A1 | 1/2013 | DeLuca |
| 2013/0027606 A1* | 1/2013 | Voss ..................... H04N 5/2258 348/349 |
| 2013/0202191 A1 | 8/2013 | Wang |
| 2013/0329971 A1 | 12/2013 | Oddou et al. |

FOREIGN PATENT DOCUMENTS

| | | |
|---|---|---|
| CN | 102006473 | 4/2011 |
| CN | 102055982 | 5/2011 |

OTHER PUBLICATIONS gDebugger, graphic Remedy, http://vvww.gremedy.com, Aug. 8, 2006.

Parhami, Computer Arithmetic, Oxford University Press, Jun. 2000, pp. 413-418.

Cheng et al., "iRotate: Automatic Screen Rotation Based on Face Orientation", Dated May 10, 2012, File iRotate.pdf.

Wang et al., "TinyMotion: Camera Phone Based Interaction Methods", CHI 2006, Apr. 22-27, 2006, Montreal, Quebec, Canada.

* cited by examiner

SYSTEM AND METHOD FOR ENHANCED MONOIMAGING

RELATED U.S. APPLICATIONS

This application is related to copending non-provisional patent application, Ser. No. 13/609,062, entitled "SYSTEM AND METHOD FOR ENHANCED STEREO IMAGING," with filing date Sep. 10, 2012, and hereby incorporated by reference in its entirety.

FIELD OF THE INVENTION

Embodiments of the present invention are generally related to image capture.

BACKGROUND OF THE INVENTION

As computer systems have advanced, processing power and speed have increased substantially. At the same time, the processors and other computer components has decreased in size allowing them to be part of an increasing number of devices. Cameras and mobile devices have benefited significantly from the advances in computing technology. The addition of camera functionality to mobile devices has made taking photographs and video quite convenient. Upon invoking the camera function, the camera calibrates to adjust the focus. However during this focus calibration, the image on the screen may be blurred or distorted which is unpleasant to the user. In addition, the user will likely not be able to use the camera during the focus calibration.

In order to compete with traditional cameras, mobile devices are increasingly being fitted with higher megapixel capacity and higher quality cameras. As stereoscopic three dimensional (S3D) movies have become popular, an increasingly popular option is to have two cameras on the mobile device to allow capture of S3D images and video. Conventional solutions often include two identical high resolution cameras each with a higher number of megapixels. Unfortunately, the inclusion of two such high end cameras significantly increases the cost and power usage of mobile devices.

Thus, while two high megapixel cameras may allow taking high quality S3D images or video, the inclusion of such high megapixel cameras significantly increases the cost and power usage and may unduly increase the size of the device.

SUMMARY OF THE INVENTION

Embodiments of the present invention are operable to provide enhanced imaging including enhanced monoimaging and video. In one embodiment, a second camera of a multi camera device has a lower resolution than a first camera thereby reducing the cost and power consumption of the device. Embodiments of the present invention are further operable to provide enhancements in the following: automatic focus, automatic exposure, automatic color balancing, detection of objects of interest, and other functionality (e.g., where a second camera is a depth sensor). The enhanced automatic focus, automatic exposure, automatic color balancing, detection of objects of interest may be advantageously faster and allow for continuous, smooth, and undisturbed preview and imaging performance of a single high resolution camera. Embodiments of the present invention are further operable to allow capture of high dynamic range images and images of extended depth of focus.

In one embodiment, the present invention is directed toward a method for configuring a first camera. The method includes capturing a first image with the first camera and determining an optical configuration based on an optical measurement performed by a second camera of a multi camera device. The optical measurement performed by the second camera may be based on an image captured by the second camera. The optical configuration may comprise a focus setting, an exposure setting, a color balance setting, and a location of an area of interest. In one embodiment, the second camera comprises a lower resolution sensor than a sensor of the first camera. In one exemplary embodiment, the second camera is operable to determine the optical configuration in less time than the first camera is operable to determine the optical configuration. The second camera may further be operable to capture an image in less time than the first camera is operable to capture the image. The method further includes sending the optical configuration from the second camera to the first camera and adjusting a configuration of the first camera based on the optical configuration. The method further includes capturing a second image with the first camera. The first image and the second image may be preview images. In one exemplary embodiment, the first camera operates at a first power consumption level and the second camera operates at a second power consumption level and the first power consumption level is greater than the second power consumption level.

In one embodiment, the present invention is implemented as a method for capturing an image. The method includes determining a first optical property and configuring a first camera based on the first optical property. The method further includes determining a second optical property and configuring a second camera based on the second optical property. In one embodiment, the first optical property is a first exposure setting and the second optical property is a second exposure setting. In another embodiment, the first optical property is a first focus position and the second optical property is a second focus position. The method further includes capturing a first image with the first camera and capturing a second image with the second camera. The first image and the second image may be captured at the same resolution. The first image and the second image may be captured substantially simultaneously. A third image may then be formed based on the first image and the second image and the third image comprises a first portion of the first image and a second portion of the second image. The third image may be a high dynamic range image or an extended depth of focus image.

In another embodiment, the present invention is directed to a computer-readable storage medium having stored thereon, computer executable instructions that, if executed by a computer system cause the computer system to perform a method of configuring a first camera. The method includes capturing a first image with the first camera and determining a focus configuration based on an optical measurement performed by a second camera. In one embodiment, the second camera is operable to determine a focal point in less time than the first camera. The focus configuration may comprise a focus position. In one embodiment, the second camera comprises a lower resolution sensor than a sensor of the first camera. The method further includes transmitting the focus configuration from the second camera to the first camera and adjusting a focus of the first camera based on the focus configuration. A second image may then be captured with the first camera. In one exemplary embodiment, the first camera comprises a first sensor and the second camera comprises a second sensor and the first sensor and the second sensor share a common aperture.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
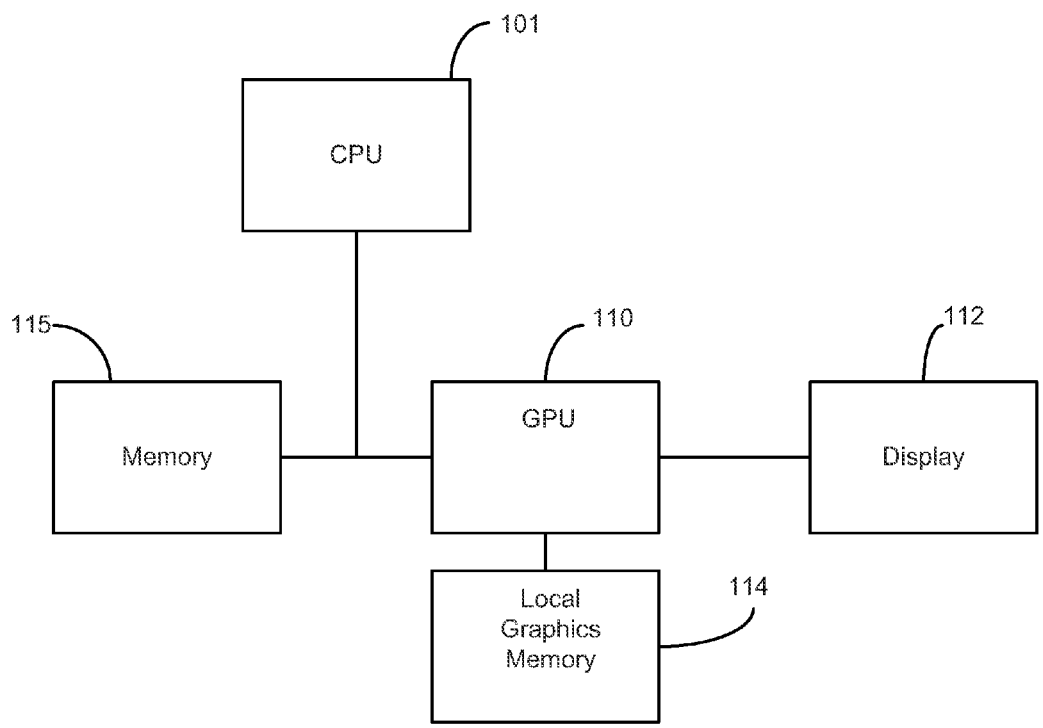
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

FIG. 1 shows an exemplary computer system 100 in accordance with one embodiment of the present invention. Computer system 100 depicts the components of a generic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Figure 2:
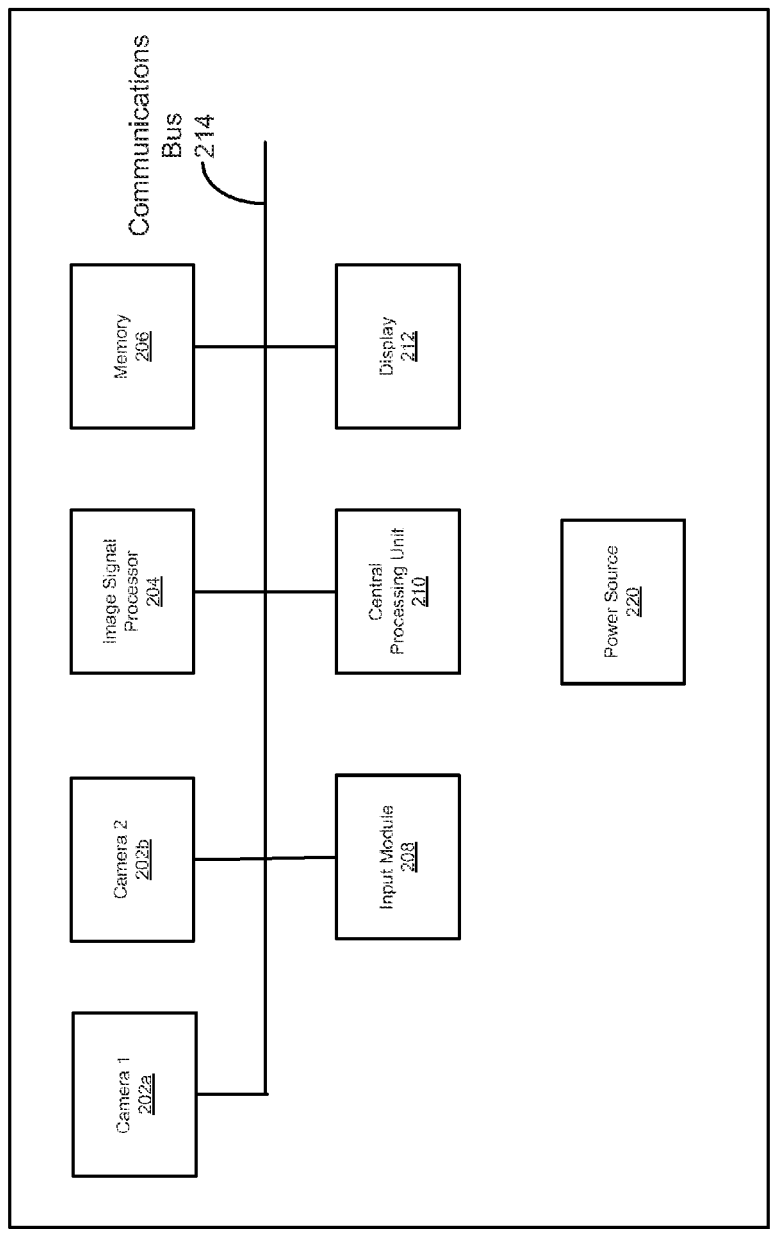
FIG. 2 shows an exemplary operating environment in accordance with one embodiment of the present invention.

Exemplary Operating Environment:

FIG. 2 shows an exemplary operating environment or "device" in accordance with one embodiment of the present invention. System 200 includes cameras 202*a-b*, image signal processor (ISP) 204, memory 206, input module 208, central processing unit (CPU) 210, display 212, communications bus 214, and power source 220. Power source 220 provides power to system 200 and may be a DC or AC power source. System 200 depicts the components of a basic system in accordance with embodiments of the present invention providing the execution platform for certain hardware-based and software-based functionality. Although specific components are disclosed in system 200, it should be appreciated that such components are examples. That is, embodiments of the present invention are well suited to having various other components or variations of the components recited in system 200. It is appreciated that the components in system 200 may operate with other components other than those presented, and that not all of the components of system 200 may be required to achieve the goals of system 200.

CPU 210 and the ISP 204 can also be integrated into a single integrated circuit die and CPU 210 and ISP 204 may share various resources, such as instruction logic, buffers, functional units and so on, or separate resources may be provided for image processing and general-purpose operations. System 200 can be implemented as, for example, a digital camera, cell phone camera, portable device (e.g., audio device, entertainment device, handheld device), webcam, video device (e.g., camcorder) and the like.

In one embodiment, cameras 202*a-b* capture light via a first lens and a second lens (not shown), respectively, and convert the light received into a signal (e.g., digital or analog). Cameras 202*a-b* may comprise any of a variety of optical sensors including, but not limited to, complementary metal-oxide-semiconductor (CMOS) or charge-coupled device (CCD) sensors. Cameras 202*a-b* are coupled to communications bus 214 and may provide image data received over communications bus 214. Cameras 202*a-b* may each comprise respective functionality to determine and configure respective optical properties and settings including, but not limited to, focus, exposure, color or white balance, and areas of interest (e.g., via a focus motor, aperture control, etc.).

Image signal processor (ISP) 204 is coupled to communications bus 214 and processes the signal generated by cameras 202*a-b*, as described herein. More specifically, image signal processor 204 may process data from sensors 202*a-b* for storing in memory 206. For example, image signal processor 204 may compress and determine a file format for an image to be stored in within memory 206.

Input module 208 allows entry of commands into system 200 which may then, among other things, control the sampling of data by cameras 202*a-b* and subsequent processing by ISP 204. Input module 208 may include, but it not limited to, navigation pads, keyboards (e.g., QWERTY), up/down buttons, touch screen controls (e.g., via display 212) and the like.

Central processing unit (CPU) 210 receives commands via input module 208 and may control a variety of operations including, but not limited to, sampling and configuration of cameras 202*a-b*, processing by ISP 204, and management (e.g., addition, transfer, and removal) of images and/or video from memory 206.

Exemplary Systems and Methods for Enhanced Monoimaging

Embodiments of the present invention are operable to provide enhanced imaging including enhanced monoimaging and video. In one embodiment, a second camera has a lower resolution than a first camera thereby reducing the overall cost and power consumption of a device. Embodiments of the present invention are further operable to provide enhanced: automatic focus, automatic exposure, automatic color balancing, detection of objects of interest, and functionality (e.g., where a second camera is a depth sensor). The enhanced automatic focus, automatic exposure, automatic color balancing, detection of objects of interest may be advantageously faster and allow for continuous, smooth, and undisturbed preview and imaging performance of a single high resolution camera. Embodiments of the present invention are further operable for capture of high dynamic range images and extended depth of focus images.

Figure 3:
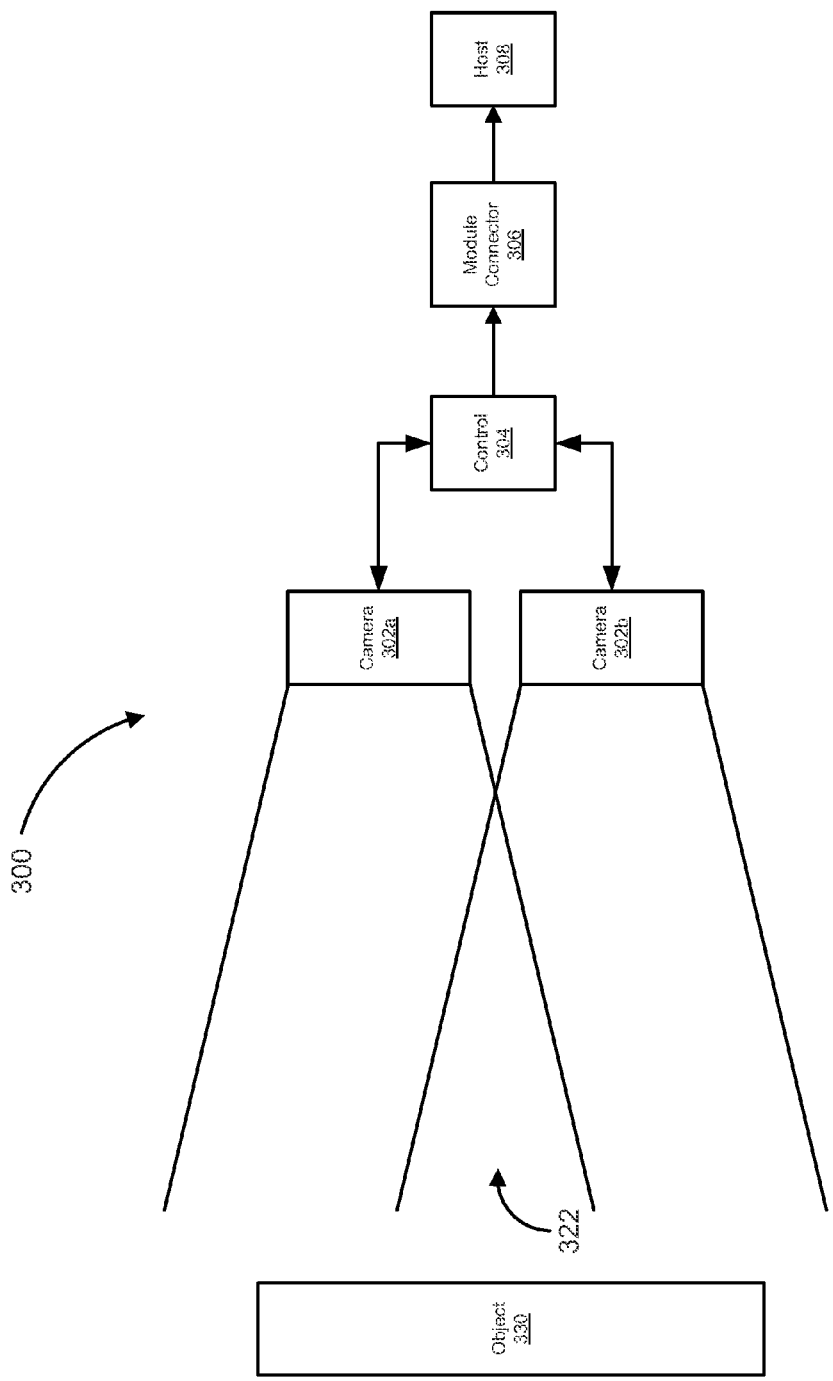
FIG. 3 shows a block diagram of exemplary components of a system for configuration in accordance with one embodiment of the present invention.

FIG. 3 shows a block diagram of exemplary components of a system for camera configuration in accordance with one embodiment of the present invention. Exemplary system 300 or "device" depicts components operable for use in configuring camera 302*a* based on a configuration determined via camera 302*b*. System 300 includes cameras 302*a-b*, control module 304, module connector 306, and host 308.

Cameras 302*a-b* may share parallel or substantially parallel optical axes. Cameras 302*a-b* may have similar or different fields of view. In one embodiment, cameras 302*a-b* may be placed in close proximity with overlapped field of view 322. Cameras 302*a-b* may be operable in conjunction to capture S3D images and video. In one embodiment, cameras 302*a-b* each have respective polarization filters to facilitate capture of S3D images and video.

Control module 304 is operable to output an image or video according to the pins of module connector 306 in a plurality of ways. In one exemplary embodiment, control module 304 is operable to output an image from camera 302*a*, output an image from camera 302*b*, and output a composite image formed from half rows or columns simultaneously captured from cameras 302*a* and 302*b*. In another exemplary embodiment, control module 304 is operable to output an image pair captured time sequentially from cameras 302*a* and 302*b* where the module data path has the capacity to transmit synchronically data from cameras 302*a*-302*b* to the host at twice the speed of a single camera. In another embodiment, control module 304 is operable to output a dual image formed with full images captured simultaneously from cameras 302*a-b* where the module data path has the capacity to transmit synchronically both data from cameras 302a and 302b to host 308 at the same speed as that from a single camera. In one embodiment, host 308 is operable to process (e.g., compress and format) and store images and video on a storage medium.

Cameras 302a-b may have fixed focus or adjustable focus. Cameras 302a-b may be each be independent camera modules. Cameras 302a-b may further be two cameras using a single imaging sensor with separate optical elements using different portions of a single imaging sensor.

Cameras 302a-b may have the same type of image sensor or may have different types (e.g., image or depth sensors). In one embodiment, cameras 302a and 302b are identical and cameras 302a-b are operable for capturing full resolution stereo or half resolution stereo images with a reduced bandwidth requirement to the host (e.g., host 308).

In one exemplary embodiment, where cameras 302a and 302b are identical, images or video of the same scene can be captured at twice the speed of a single camera when configured as time sequential capture. For example, if cameras 302a-b are each operable to capture 30 frames or images per second, in combination cameras 302a-b may capture 60 images per second (e.g., with a slight time offset between each capture).

Cameras 302a-b may further have the same or different imaging resolutions. In one embodiment, cameras 302a-b may be have different resolution optical sensors. For example, camera 302a may have a higher resolution (e.g., 13 megapixels) and camera 302b may have a lower resolution (e.g., 2 megapixels). The lower resolution camera (e.g., camera 302b) may thus analyze and make determinations about the environment around exemplary system 300. It is appreciated that either of cameras 302a-b may have a relatively higher resolution sensor and embodiments are not limited to whether camera 302a having a higher resolution than camera 302b. In one embodiment, when cameras 302a-b are different, camera 302a operates as a primary camera or master camera and camera 302b operates as an auxiliary or slave camera when images or video are captured by camera 302a.

Cameras 302a and 302b may thus be different but have complementary performance. Cameras 302a-b may have the same or different output frame rates and capture speeds. Camera 302a may be operable for a higher resolution capture (e.g., 13 megapixels) at a normal camera speed while camera 302b has a higher speed with lower resolution (e.g., 2 megapixels). Higher resolution images or video may be captured with camera 302a and higher speed images or video may be captured with camera 302b (e.g., high-definition (HD) video). Camera 302b may thus have a lower cost than camera 302a thereby allowing a system to have two cameras while also having reduced cost. Having a second camera of a lower resolution (e.g., camera 302b) reduces the cost of a device as well as bandwidth (e.g., of a bus for transmitting data from cameras 302a-b).

Camera 302b may thus be operable for faster configuration determination relative to camera 302a. For example, camera 302b may be operable for determining focus, exposure, color balance, and areas of interest in less time than camera 302a. In one embodiment, the use of the lower resolution camera (e.g., camera 302b) to make various determinations (e.g., focus, exposure, color balance, areas of interest) saves power over using the higher resolution camera (e.g., camera 302a) to do same functions. For example, camera 302b may have a lower resolution (e.g., 2 megapixels), have a higher capture speed than camera 302a, and lower power consumption than camera 302a. The lower resolution camera (e.g., camera 302b) may thus be able to make optical property determinations faster with less power than the higher resolution camera (e.g., camera 302a). In one exemplary embodiment, camera 302b is operable to periodically or continuously make optical property or configuration determinations (e.g., focus, exposure, color balance, areas of interest) and send the results of the optical property determinations to camera 302a which then may adjust accordingly.

Conventional solutions may determine focus based on conservative methods in order to reduce blurring or harsh preview images. In one exemplary embodiment, the lower resolution camera (e.g., camera 302b) may make configuration determinations in a relatively aggressive or less conservative manner that would otherwise produce very blurred or harsh preview images.

In one exemplary embodiment, camera 302b may make configuration determinations while camera 302a is used to capture video. Camera 302b may thus make configuration determinations without destroying, blowing out, making the video too bright or too dark, or out of focus. Camera 302b may further make configuration determinations taking longer than the time for camera 302a to capture a frame of video. Camera 302b may thereby make more accurate configuration determinations that might otherwise be difficult within the time to capture a single frame (e.g., 1/30 of a second for 30 frames per second (fps) video). In one embodiment, the lower resolution camera (e.g., camera 302b) measures the light of a scene (e.g., including object 330) and passes the aperture or gain to setting the higher resolution camera (e.g., camera 302a).

In another exemplary embodiment, cameras 302a and 302b may have different spectral filters thereby allowing cameras 302a and 302b to capture images under different lighting conditions and different spectrums of light. In one embodiment, a probing light may be sent for object detection that is in a portion of the spectrum exclusive to camera 302b and not received by primary camera 302a. For example, camera 302a may have an IR filter which allows camera 302b (without an IR filter) to operate under low light conditions under which camera 302a cannot. Use of such an IR filter may further allow configuration determinations (e.g., automatic focus, automatic exposure, and automatic color balancing) to be done in low lighting or dark environments.

Embodiments of the present invention are further operable for use with gradient filters and neutral density filters. Band pass filters may also be used such that one camera (e.g., camera 302a) operates in a first portion of the spectrum and the other camera (e.g., camera 302b) operates in an adjacent second portion of the spectrum thereby allowing use of different each camera in exclusive portions of the spectrum.

Embodiments of the present invention may further have a second camera (e.g., camera 302b) of a different type than the first camera (e.g., camera 302a). In one embodiment, camera 302b is a depth or time of flight sensor operable to determine the distances of object pixels or pixels corresponding to objects within a common field of view and transmit such information to a high resolution camera (e.g., camera 302a). In another embodiment, camera 302a may further request depth information from camera 302b.

Exemplary Automatic Focus

Preview images are commonly shown to a user prior to the beginning or invoking of image or video capture. In conventional solutions, preview images and the camera share the same data path, such that when an imaging parameter is of a camera changed, the viewer or user will see the changes. The changing of imaging parameters often results in blurring which is disturbing to the user.

Embodiments of the present invention further provide for enhanced automatic focus where a lower resolution camera (e.g., camera 302b) is used to determine a focus position which is transmitted to a higher resolution camera (e.g., camera 302a). Embodiments of the present invention thereby increase focus speed, removing blurring, and remove other undesirable effects in images or video prior to image capture. For example, embodiments of the present invention are operable to reduce or remove blurring of preview images visible to a user (e.g., presented on a display or screen) prior to image or video capture because the camera (e.g., camera 302a) generating the preview images adjusts to the received focus position instead of determining a focus position by trying multiple focus positions. In one embodiment, the lower resolution camera (e.g., camera 302b) is operable to perform a focus position determination faster than the higher resolution camera (e.g., camera 302a).

The focus or calibration information thereby allows continuous, smooth, and undisturbed performance of the camera 302a. The use of a lower resolution camera (e.g., camera 302b) to perform focus determinations for a higher resolution camera (e.g., camera 302a) thereby allows the preview seen by the user to be steady and smooth. In other words, the viewer will not see the effects of the focusing determinations by the lower resolution camera (e.g., camera 302b). For example, the viewer will see a steady image flow stream instead of images as the camera moves the lens back and forth while determine a focal position.

In one embodiment, the imaging properties or parameters of camera 302a and 302b can be determined with configurations based on viewing the same objects in the overlapped field of view. In one exemplary embodiment, the focusing position difference between camera 302a and 302b can be calibrated based on a determination of camera 302b and communicated to camera 302a. The focusing of camera 302a may be a function of the focus of camera 302b based on the equation:

$F_A=f(F_B)$, wherein f( ) may be a predefined mathematical equation, $F_A$ is the focus position of camera 302a, and $F_B$ is the focus position of camera 302b. The function f( ) may be used to determine the mechanical and optical calibration of camera 302a. The function f( ) may further be based on the predetermined properties of each of cameras 302a-b.

In one embodiment, camera 302b is operable to capture an image and measure the contrast of a feature having an edge in order to investigate the scene before cameras 302a-b. Camera 302b may then capture more images corresponding to different focus positions and the image with the highest contrast is used to determine the focus position. The images may be captured corresponding to a respective focus position of a lens of camera 302b which is actuated by a focus motor of camera 302b.

Exemplary Automatic Exposure

Embodiments of the present invention further provide for enhanced automatic exposure where a lower resolution camera (e.g., camera 302b) is operable for determining exposure settings of the scene common to cameras 302a-b (e.g., including object 330) and transmitting the exposure information or parameters to a higher resolution camera (e.g., camera 302a). Camera 302a may then capture images or video based on the exposure information received from camera 302b. In one embodiment, camera 302b captures images at a lower resolution and higher speed than camera 302a. Camera 302b may be operable to determine exposure settings in less time than camera 302a (e.g., as a function of camera 302b's lower resolution) thereby improving exposure calibration time of the overall device. In one exemplary embodiment, the exposure difference between camera 302a and 302b can be calibrated based on exposure time or pixel gains when achieving the same pixel brightness.

Exemplary Automatic Color Balance

Embodiments of the present invention may further be operable for enhanced automatic color balancing where the lower resolution camera (e.g., camera 302b) is operable for use in determining automatic color balance settings of the scene common to cameras 302a-b (e.g., including object 330) and passing the color balance parameters to a higher resolution camera (e.g., camera 302a). For example, camera 302b may be operable to automatically determine the best or optimal color balance settings of the scene common to cameras 302a-b (e.g., including object 330) and communicate the color balance parameters to camera 302a. Camera 302a may then capture images or video based on the color balance parameters received from camera 302b. In one embodiment, camera 302b captures at a lower resolution and higher speed than camera 302a and camera 302b may optionally have an IR filter.

Exemplary Automatic Area of Interest Detection

Embodiments of the present invention further provide for detection of areas of interest (e.g., object or facial detection). In one embodiment, a lower resolution camera (e.g., camera 302b) may be used to detect the presence and the locations of objects based on one or more pixels and pass the location information to a higher resolution camera (e.g., camera 302a). The higher resolution camera may automatically focus based on the location information and capture images or video. For example, camera 302b may detect the presence and locations of a face based on the analysis of five pixels and communicate the corresponding location information of the pixels to camera 302a.

Figure 4:
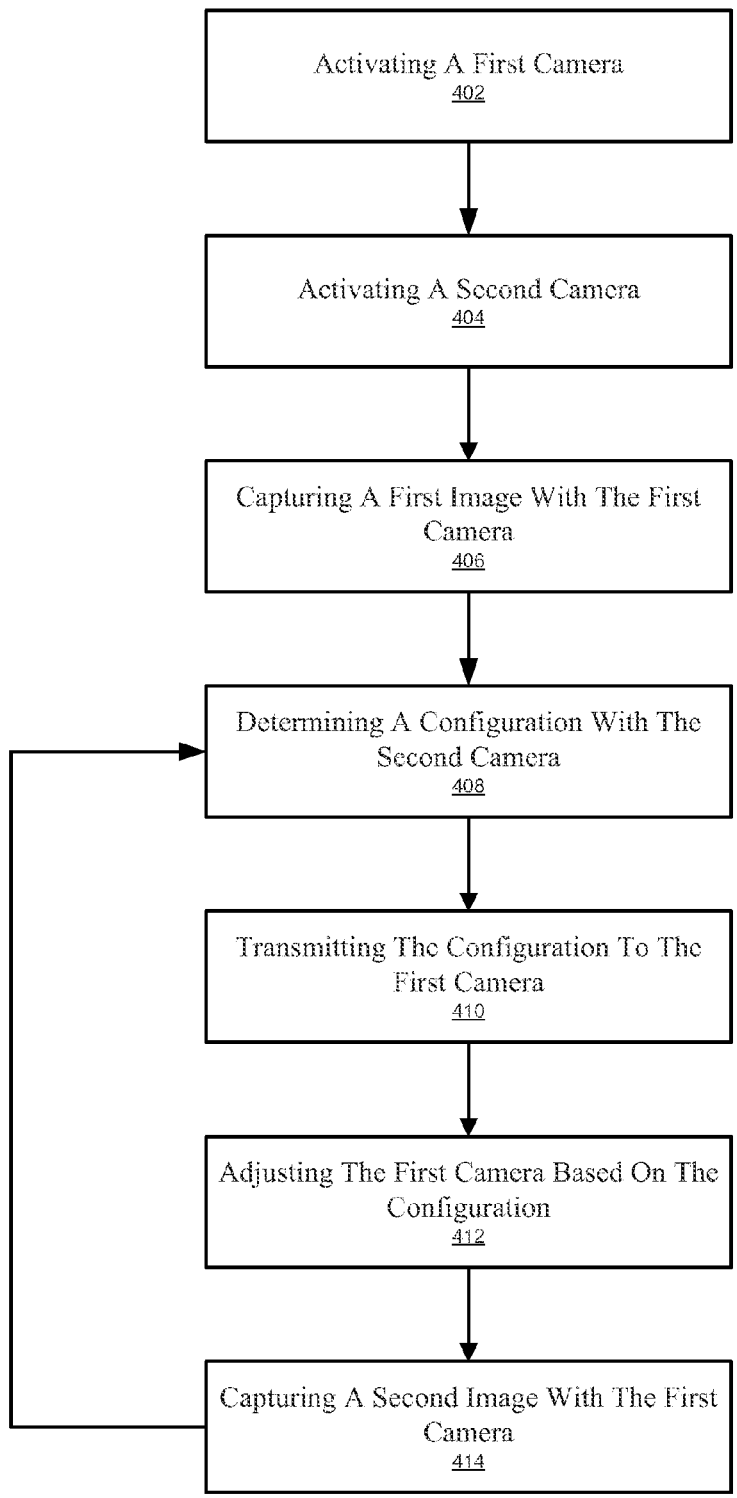
FIG. 4 shows a flowchart of an exemplary electronic component controlled process for camera configuration in accordance with one embodiment of the present invention.
Figure 6:
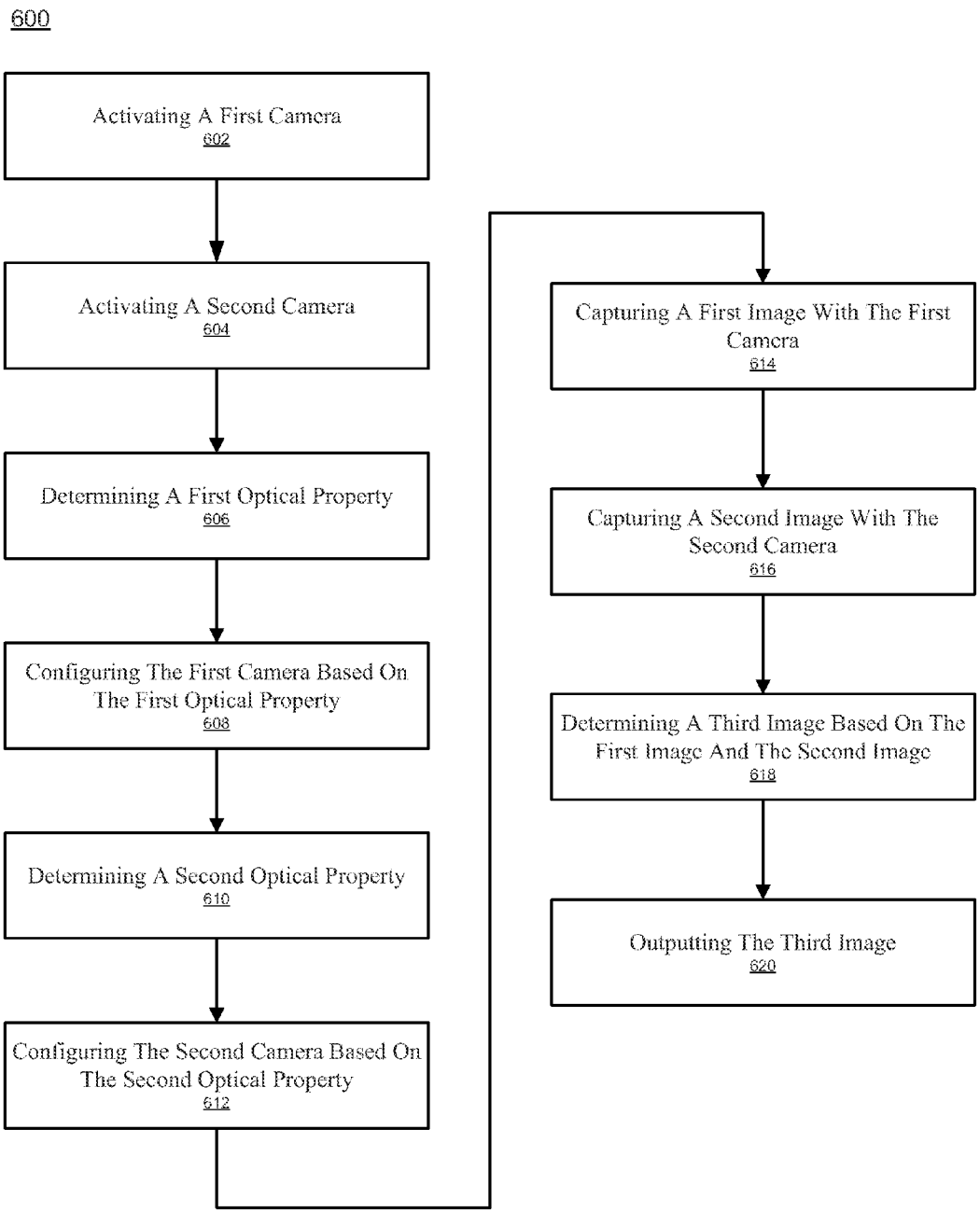
FIG. 6 shows a flowchart of an exemplary electronic component controlled process for image capture in accordance with one embodiment of the present invention.

With reference to FIGS. 4 and 6, flowcharts 400 and 600 illustrate example functions used by various embodiments of the present invention. Although specific function blocks ("blocks") are disclosed in flowcharts 400 and 600, such steps are examples. That is, embodiments are well suited to performing various other blocks or variations of the blocks recited in flowcharts 400 and 600. It is appreciated that the blocks in flowcharts 400 and 600 may be performed in an order different than presented, and that not all of the blocks in flowcharts 400 and 600 may be performed.

FIG. 4 shows a flowchart of an exemplary electronic component controlled process for camera configuration in accordance with one embodiment of the present invention. In one embodiment, FIG. 4 depicts a process for configuring a first camera (e.g., camera 302a) based on a configuration determination performed by a second camera (e.g., camera 302b).

At block 402, a first camera is activated. A device may have two cameras which may be activated or turned on independently. For example, the higher resolution camera of the two cameras may be activated for a monoscopic or still image capture or for video capture.

At block 404, a second camera is activated. For example, the lower resolution camera of the two cameras may be activated for determining camera setting when a higher resolution camera is in a monoscopic or still image capture mode or for video capture. In one embodiment, the lower resolution camera is activated to be used for determining camera configuration settings to be applied to the higher resolution camera. The first camera may operate at a power consumption level that is greater than the power consumption level of the second camera. The second camera may further be operable to capture an image in less time than the first camera. In one embodiment, the first camera comprises a first sensor and the second camera comprises a second sensor and the first sensor and the second sensor share a single aperture.

At block 406, a first image is captured with the first camera. In one embodiment, the first image may be a preview image which is presented or displayed on a screen of the device to a user. Preview images captured by the first camera may have a lower resolution than the full resolution that the first camera is capable of capturing.

At block 408, an optical configuration is determined with the second camera. The second camera may have a lower resolution sensor than a sensor of the first camera (e.g., a 2 Megapixels second camera and 13 Megapixel first camera). In one embodiment, the second camera determines an optical configuration based on an optical measurement. The optical measurement performed by the second camera may be based on an image captured by the second camera. For example, the second camera may determine a focus setting based on analyzing the contrast of a captured image. In one embodiment, the second camera is operable to determine the optical configuration in less time than the first camera. The optical configuration may comprise a focus configuration (e.g., focus setting, focus position, or focal point), an exposure setting, a color balance setting, and a location of an area of interest (e.g., locations of pixels corresponding to a face).

At block 410, the optical configuration is sent or transmitted to the first camera by the second camera. The second camera may be directly or indirectly coupled to the first camera.

At block 412, the first camera is adjusted based on the optical configuration. The first camera may configure itself to a focus position, exposure, or color balance based on the optical configuration received from the second camera.

At block 414, a second image is captured with the first camera. The first and second image captured by the first camera may be preview images (e.g., which are displayed) or may be image or video captures at the full resolution of the first camera. Block 408 may then be performed as the second camera is used to determine another optical calibration or configuration for the first camera and thereby provide dynamic calibration. The second camera may continuously or periodically determine optical configurations and send each optical configuration to the first camera. The second image may then be stored and formatted (e.g., compressed according to a format standard).

Figure 5:
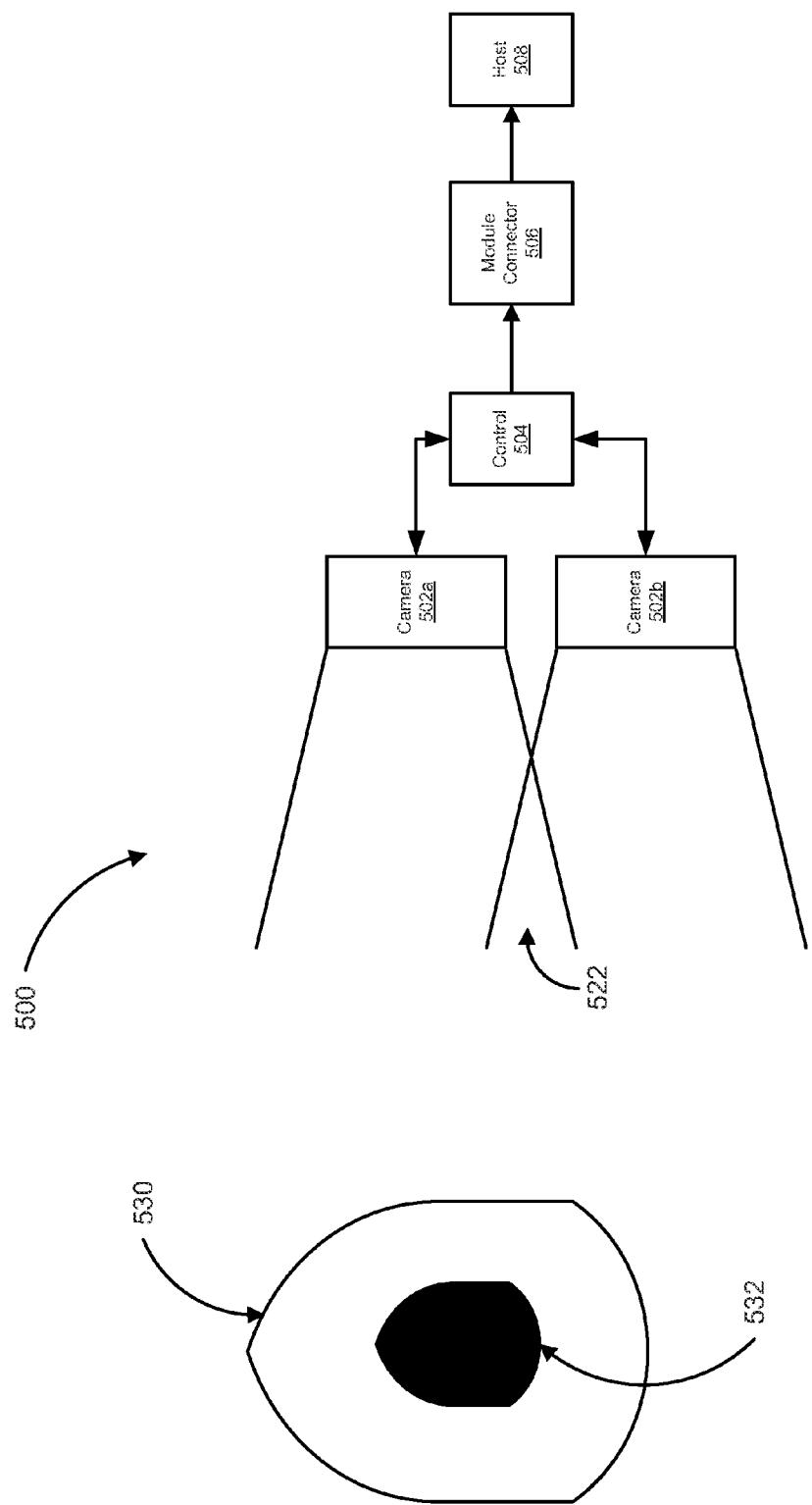
FIG. 5 shows a block diagram of exemplary components of a system for image capture in accordance with one embodiment of the present invention.

FIG. 5 shows a block diagram of exemplary components of a system for image capture in accordance with one embodiment of the present invention. In one embodiment, FIG. 5 depicts a system operable to capture two or more images based on different optical properties (e.g., exposure or focus position) and form an image based on the two or more captured images. System 500 includes cameras 502a-b, control module 504, module connector 506, host 508, and lenses 520a-b. In one embodiment, cameras 502a-b share a common field of view which overlaps in overlapped field of view 522.

Cameras 502a-b may further be operable for capturing photos or video of the same scene simultaneously with a high dynamic range and extended depth of focus (EDoF). High dynamic range images or videos may be based on using a different exposure settings on each respective camera to construct a composite image of higher dynamic range described further below. Extended depth of focus images or video may be constructed using a different focus positions on each respective camera to construct a composite image of extended depth of focus described further herein.

It is noted that it can be difficult to select a proper exposure time for a scene that has bright well lit portions and dark portions. Object 530 includes dark portion 532. For example, object 530 may be a mountain in direct sunlight and dark portion 532 may be a cave such that with respect to cameras 502a-b, the mountain is very well lit while cave 532 is substantially darker. Embodiments of the present invention are operable to perform substantially simultaneous capture with each respective camera having a respective exposure time. The images from each of the cameras may then be merged or combined to form a properly illuminated composite image such that portions of the images which are not overexposed or underexposed are selected in forming the composite image. For example, the merged image may contain a portion of object 530 which may have direct sunlight is properly illuminated (e.g., not over exposed) and cave opening 532 which is dark is properly illuminated (e.g., not under exposed).

In one embodiment, the composite image is formed based on determining which pixels are different between the respective images of each camera (e.g., cameras 502a-b). For example, a portion of a first image for a camera with a longer relative exposure time where cave opening 532 is lighter will be selected over a portion of the second image corresponding to cave opening 532 which is darker due to the shorter exposure time. A portion of the second image corresponding to mountain 530 in direct sunlight where the exposure time was relatively shorter will be selected over a portion of the first image in which mountain 530 is overexposed due to being in direct sunlight.

In one embodiment, the high dynamic range functionality is a default option and exemplary system 500 automatically determines a composite image. The determination of the composite image may be based on registering pixels from one image to pixels of the second image based on the placement of the cameras, optical properties, and the relation of the pixels from one image to the other image.

FIG. 6 shows a flowchart of an exemplary electronic component controlled process for image capture in accordance with one embodiment of the present invention. In one exemplary embodiment, FIG. 6 depicts a flowchart of constructing a high dynamic range image (e.g., based on different exposures) or constructing an extended depth of focus image (e.g., based on different focus positions) from one or more images captured with two cameras (e.g., camera 302a-b).

At block 602, a first camera is activated. At block 604, a second camera is activated. As described herein, the first camera and second camera may be activated or turned on independently (e.g., exit a low power state). For example, the higher resolution camera of the two cameras may be activated for a monoscopic or still image capture or for video capture.

At block 606, a first optical property is determined. The first optical property may be an exposure setting or focus position. A first camera may capture a preview image while a second camera determines an exposure setting or focus position (e.g., as described in process 400). For example, the first or second camera may determine an exposure setting where a first portion of the scene is properly exposed (e.g. not overexposed or too bright, or not underexposed or too dark). The first or second camera may determine a focus position where a first portion of the scene is in focus (e.g., not blurred).

At block 608, the first camera is configured based on the first optical property. The first camera may be configured with a first exposure setting corresponding to a first portion of an image of a scene being properly exposed or configured with a first focus position corresponding to a first portion of an image of a scene being in focus.

At block 610, a second optical property is determined. The second optical property may be an exposure setting or focus position. A second camera may capture a preview image and determine an exposure setting or focus position (e.g., as described in process 400). For example, the first or second camera may determine an exposure setting where a second portion of the scene is properly exposed (e.g. not overexposed or too bright, or not underexposed or too dark). The first or second camera may determine a focus position where a second portion of the scene is in focus (e.g., not blurred).

At block 612, the second camera is configured based on the second optical property. The second camera may be configured with a second exposure setting corresponding to a second portion of an image of a scene being properly exposed or configured with a second focus position corresponding to a second portion of an image of a scene being in focus.

At block 614, a first image is captured with the first camera. The first image captured may have a properly exposed portion corresponding to the exposure setting and an over or under exposed portion. The first image may have a portion that is in focus (e.g., not blurry) and an out of focus portion (e.g., blurry).

At block 616, a second image is captured with the second camera. The first image and the second image may be captured simultaneously and at the same resolution (e.g., where the first camera and the second camera have the same resolution or an image from one camera is downsampled or upsampled to match the resolution of the other camera). The second image captured may have a properly exposed portion corresponding to the second exposure setting and an over or under exposed portion. The second image may have a portion that is in focus (e.g., not blurry) and an out of focus portion (e.g., blurry).

At block 618, a third image is determined based on the first image and second image. The third image may be determined or formed which comprises a first portion of the first image and a second portion of the second image. The third image may be a high dynamic range image having a proper exposure throughout the image. For example, the third image may be a composite of the properly exposed portion of the first image and the properly exposed portion of the second image. The third image may thus have areas that are well light or properly exposed portions that would normally be dark or underexposed (e.g., a cave opening or shadow) in an image captured under a single exposure.

The third image may be an extended depth of focus image having focus throughout the image (e.g., in the foreground and background). In another exemplary embodiment, the third image may be a composite of the in focus portion of the first image and the in focus portion of the second image. The third image may thus have areas that are in focus portions that would normally be out of focus or blurry with an image captured with a single a focus position. For example, a close up picture of a bee on a flower might normally have an out of focus or blurry background or area behind the flower, while an image produced by embodiments of the present invention may have an in focus foreground and background or area behind the flower.

At block 620, the third image is output. The third image may be output to a host device (e.g., host 308) or image processing device (e.g., for compression, storage, etc.).

Figure 7:
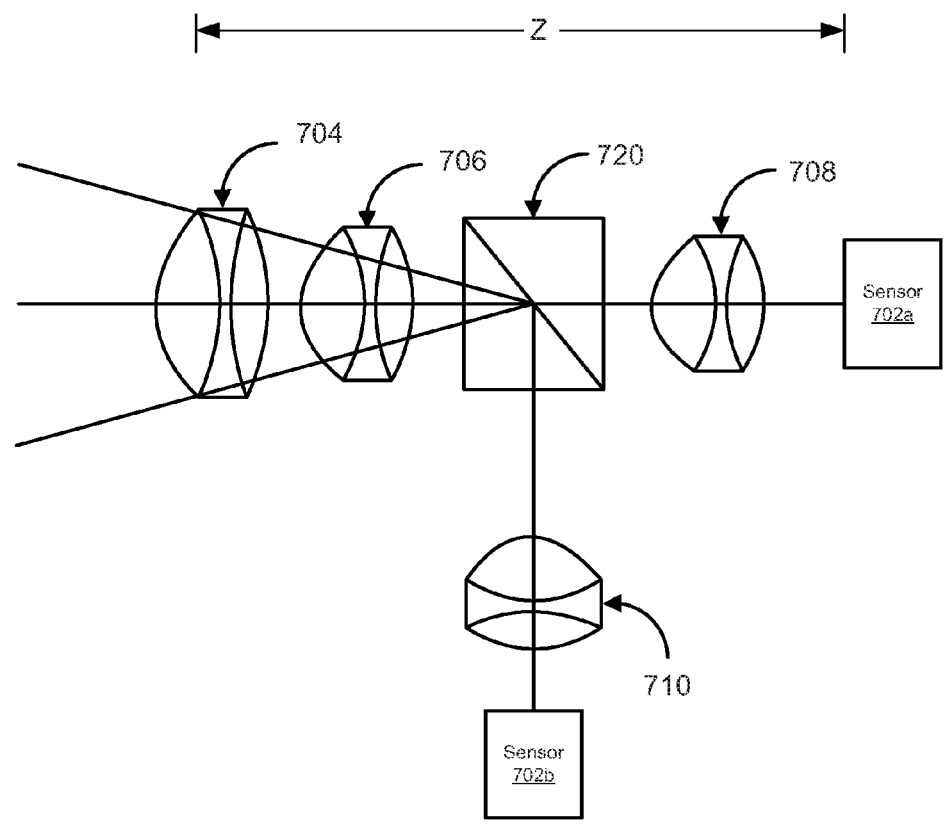
FIG. 7 shows a block diagram of a system comprising a common or single aperture in accordance with one embodiment of the present invention.

FIG. 7 shows a block diagram of a system comprising a common or single aperture in accordance with one embodiment of the present invention. FIG. 7 depicts a light splitter being used in conjunction with a single aperture to provide light to two optical sensors. System 700 includes sensors 702a-b, lenses 704-710, and beam splitter 720. It is noted the system 700 advantageously has a single aperture that is shared by sensors 702a-b.

In one embodiment, beam splitter 720 is an optical device that splits a beam of light into two beams of light. In one exemplary embodiment, beam splitter 720 is a photonic crystal.

Lenses 704 and 706 are operable for focusing light onto beam splitter 720. In one embodiment, lenses 704-706 may be collection lenses which are shared by sensors 702a-b and focus light onto beam splitter 720. Lenses 704 and 706 may comprise blue/green glass operable to reduce vignetting, polarizing filters, or IR filters.

Lens 708 focuses light on sensor 702a. Lens 710 focuses light on sensor 702b. Lenses 708 and 710 may be operated independently thereby allowing lens 710 and sensor 702b to be used to determine optical calibrations or configurations (e.g., focus, exposure, and color balance) without disturbing capture or preview images or video captured by sensor 702a.

Sensor 702a, lens 708, lens 704, and lens 706 are operable to operate as a portion of a first camera (e.g., camera 302a). Sensor 702b, lens 710, lens 704, and lens 706 are operable to operate as a portion of a second camera (e.g., camera 302b). Sensors 702a-b may have different resolutions, capture speeds, and power consumptions similar to those described with respect to cameras 302a-b.

In one embodiment, beam splitter 720 has a polarization of 50% which transmits 50% of the light to each of sensors 702a-b. Beam splitter 720 thereby allows simultaneous capture with the identical view point. In one embodiment, the faster of sensors 702a-b can be used to perform video capture. In one embodiment, beam splitter 720 has a cube shape and reflects a portion of the light at a 45° angle.

In one exemplary embodiment, beam splitter 720 transmit 80% of the light to a primary sensor (e.g., sensor 702a) and 20% of the light to an auxiliary sensor (e.g., sensor 702b). Sensor 702a-b could then be used for high dynamic range image capture, as described herein, and the auxiliary sensor (e.g., sensor 702b) would be capturing the brightest regions or highlights of the scene due to receiving 20% of the light. Images from the auxiliary sensor (e.g., sensor 702b) may then be used form a high dynamic range image, as described herein.

Embodiments of the present invention as described above may be implemented in a manner substantially similar to system 700 and perform the functions of embodiments of the present invention as described herein (e.g., FIGS. 3-6). For example, a first camera comprising sensor 702b and lenses 704, 706, and 710 may be used to determine a focus, exposure, color balance, and objects of interest and the corresponding information is transmitted to a second camera comprising sensor 702a and lenses 704, 706, and 710 for calibrating or configuring the second camera. The cameras comprising sensors 702a-b may also be configured with different exposures to be used in producing high dynamic range images or different focus positions to be used in producing extended depth of focus images.

Figure 8:
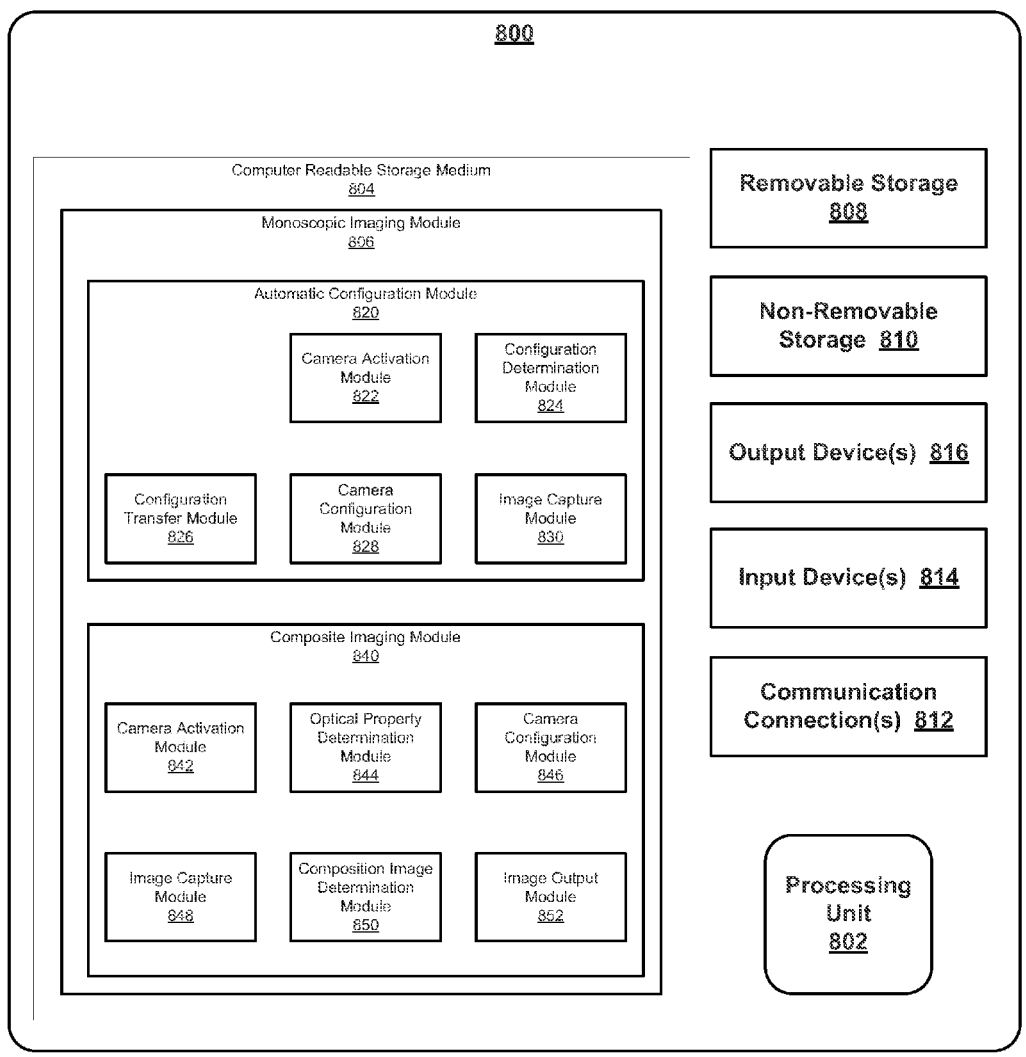
FIG. 8 shows a block diagram of exemplary computer system and corresponding modules, in accordance with one embodiment of the present invention.

FIG. 8 illustrates example components used by various embodiments of the present invention. Although specific components are disclosed in computing system environment 800, it should be appreciated that such components are examples. That is, embodiments of the present invention are well suited to having various other components or variations of the components recited in computing system environment 800. It is appreciated that the components in computing system environment 800 may operate with other components than those presented, and that not all of the components of system 800 may be required to achieve the goals of computing system environment 800.

FIG. 8 shows a block diagram of an exemplary computing system environment 800, in accordance with one embodiment of the present invention. With reference to FIG. 8, an exemplary system module for implementing embodiments includes a general purpose computing system environment, such as computing system environment 800. Computing system environment 800 may include, but is not limited to, servers, desktop computers, laptops, tablet PCs, mobile devices, and smartphones. In its most basic configuration, computing system environment 800 typically includes at least one processing unit 802 and computer readable storage medium 804. Depending on the exact configuration and type of computing system environment, computer readable storage medium 804 may be volatile (such as RAM), non-volatile (such as ROM, flash memory, etc.) or some combination of the two. Portions of computer readable storage medium 804 when executed facilitate image capture (e.g., processes 400 and 600).

Additionally, computing system environment 800 may also have additional features/functionality. For example, computing system environment 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Computer readable medium 804, removable storage 808 and nonremovable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 800. Any such computer storage media may be part of computing system environment 800.

Computing system environment 800 may also contain communications connection(s) 812 that allow it to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 812 may allow computing system environment 800 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 812 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 800 may also have input device(s) 814 such as a keyboard, mouse, pen, voice input device, touch input device, remote control, etc. Output device(s) 816 such as a display, speakers, etc. may also be included. All these devices are well known in the art and are not discussed at length.

In one embodiment, computer readable storage medium 804 includes monoscopic imaging module 806. Monoscopic imaging module 806 includes automatic configuration module 820 and composite imaging module 840.

Automatic configuration module 820 includes camera activation module 822, configuration determination module 824, configuration transfer module 826, camera configuration module 828, and image capture module 830. Camera activation module 822 is operable to activate one or more cameras, as described herein. Camera activation module 822 may further signal activation of a particular mode of a camera, e.g., a configuration determination mode. Configuration determination module 824 is operable to determination a configuration of a first camera based on information gathered with a second camera, as described herein. Configuration determination module 824 may determine a configuration of a first camera including a focus position, exposure, color balance, or area of interest.

Configuration transfer module 826 is operable for transmitting or sending a configuration determined with a first camera to a second camera. Camera configuration module 828 is operable to configure a camera based on a received configuration. In one embodiment, camera configuration module 828 is operable to configure the focus position, exposure, color balance, or area of interest. Image capture module 830 is operable for controlling the capturing of images or video and for capturing preview images which may be presented on a screen of a device for viewing by a user.

Composite imaging module 840 includes camera activation module 842, optical property determination module 844, camera configuration module 846, image capture module 848, composite image determination module 850, and image output module 852. Camera activation module 842 is operable to activate one or more cameras, as described herein.

Optical property determination module 844 is operable to determine one or more optical properties, e.g., focus and/or exposure, for image capture by more than one camera, as described herein. Camera configuration module 846 is operable to configure a first camera and second camera based on the optical properties determined by optical property determination module 844. For example, camera configuration module 846 may configure a first camera with a first exposure setting and a second camera with a second exposure setting, e.g., for capture of a high dynamic range image. Camera configuration module 846 may further configure a first camera with a first focus position and a second camera with a second focus position, e.g., for capture of an extended depth of focus image. Image capture module 848 is operable for controlling capturing of images or video and for capturing preview images which may be presented on a screen of a device for viewing by a user. Composite image determination module 850 is operable for determining a portion of a first image captured with a first camera and a portion of a second image captured with a second camera to be used to form a composite image, as described herein. Image output module 852 is operable for outputting a composite image to a storage medium or screen, as described herein.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for configuring a first camera, said method comprising:
    capturing a first image with said first camera;
    determining an optical configuration based on an optical measurement performed by a second camera, wherein said second camera comprises a lower resolution sensor than a sensor of said first camera;
    sending said optical configuration from said second camera to said first camera; and
    adjusting a configuration of said first camera based on said optical configuration and a predetermined mathematical function correlating said first camera and said second camera with respect to said optical configuration; and
    capturing a second image with said first camera, wherein said first image and said second image are preview images.

2. The method as described in claim 1 wherein said optical configuration comprises a focus setting.

3. The method as described in claim 1 wherein said optical configuration comprises an exposure setting.

4. The method as described in claim 1 wherein said optical configuration comprises a color balance setting.

5. The method as described in claim 1 wherein said optical configuration comprises a location of an area of interest.

6. The method as described in claim 1 wherein said second camera is operable to determine said optical configuration in less time than said first camera is operable of determining said optical configuration.

7. The method as described in claim 1 wherein said first camera operates at a first power consumption level and said second camera operates at a second power consumption level, and wherein said first power consumption level is greater than said second power consumption level.

8. The method as described in claim 1 wherein said second camera is operable to capture an image in less time than said first camera is operable to capture said image.

9. The method as described in claim 1 wherein said optical measurement performed by said second camera is based on an image captured by said second camera.

10. A non-transitory computer-readable storage medium having stored thereon, computer executable instructions that, if executed by a computer system cause the computer system to perform a method of configuring a first camera, said method comprising:
    capturing a first image with said first camera;
    determining a focus configuration based on an optical measurement performed by a second camera, wherein said second camera comprises a lower resolution sensor than a sensor of said first camera;
    transmitting said focus configuration from said second camera to said first camera; and
    adjusting a focus of said first camera based on said focus configuration and a predetermined mathematical function correlating said first camera and said second camera with respect to said focus configuration; and
    capturing a second image with said first camera.

11. The non-transitory computer-readable storage medium as described in claim 10 wherein said focus configuration comprises a focus position.

12. The non-transitory computer-readable storage medium as described in claim 10 wherein said second camera is operable to determine a focal point in less time than said first camera.

13. The non-transitory computer-readable storage medium as described in claim 10 wherein said first camera comprises a first sensor and said second camera comprises a second sensor, and wherein said first sensor and said second sensor share a common aperture.

14. A system comprising:
    a first camera comprising a first imaging sensor;
    a second camera comprising a second imaging sensor that has a lower resolution than said first imaging sensor;
    a processor coupled to said first camera and said second camera; and
    memory coupled to said processor and comprising instructions that, when executed by said processor, cause the system to perform a method of capturing images, said method comprising:
        capturing a first image with said first camera;
        determining an optical configuration based on an optical measurement performed by the second camera;
        sending said optical configuration from said second camera to said first camera; and
        adjusting a configuration of said first camera based on said optical configuration and a predetermined mathematical function correlating said first camera and said second camera with respect to said optical configuration; and
        capturing a second image with said first camera.

15. The system as described in claim 14, wherein said second camera has a higher capture speed and a higher frame rate than said first camera.

16. The system as described in claim 14, wherein said first camera is configured to capture images under different lighting conditions than said second camera.

17. The system as described in claim 14, wherein said optical configuration is selected from a group consisting of a focus setting, an exposure setting, a color balance setting, and a location of an area of interest.

18. The system as described in claim 14, wherein said second camera is operable to determine said optical configuration in less time than said first camera.

19. The system as described in claim 14, wherein said first camera operates at a greater power consumption level than said second camera.

20. The system as described in claim 14, wherein said method further comprises
- rendering said first image on a display device for user preview; and
- storing said second image in a predetermined format.

* * * * *